United States Patent Office 3,740,382
Patented June 19, 1973

3,740,382
STEREOSPECIFIC SYNTHETIC RUBBER BASED ON 1,3-BUTADIENE AND METHOD OF PRODUCING SAME
Boris Alexandrovich Dolgoplosk, Vystavochny pereulok 3, kv. 36; Elena Ivanovna Tinyakova, ulitsa Krasikova 19, kv. 104; Solomon Isaakovich Beilin, proezd Shokdlskogo 39, kv. 43; Kirill Lvovich Makovetsky, ulitsa Dybenko 38, kv. 8; Galina Moiseevna Chernenko, ulitsa Alabiana 3, kv. 330; Irina Yakovlevna Ostrovskaya, prospekt Mira 72, kv. 2; and Vladimir Alexandrovich Krol, ulitsa Avtovskaya 25, kv. 8, all of Moscow, U.S.S.R.; and Elena Konstantinovna Khrennikova, Novo-Izmailovsky prospekt 4, kv. 219, Leningrad, U.S.S.R.
No Drawing. Filed Aug. 4, 1970, Ser. No. 60,916
Int. Cl. C08d 3/08, 1/18
U.S. Cl. 260—82.1    2 Claims

ABSTRACT OF THE DISCLOSURE

A stereospecific synthetic rubber on the basis of 1,3-butadiene, characterized in that it is a cis-copolymer of 1,3-butadiene with conjugated cyclic dienes having from 5 to 6 carbon atoms in the cycle, the content of cyclic links in the copolymer chain ranging from 3 to 20 mol percent.

Said rubber is produced by a method, residing in that 1,3-butadiene is copolymerized with conjugated cyclic dienes having from 5 to 6 carbon atoms in the cycle, with the molar ratio of the monomers being 95–75:5–25 respectively. The process is carried out at a temperature ranging from −15 to +80° C., in the medium of a hydrocarbon solvent, in the presence of catalysts of $\pi$-allyl type, these catalysts being $\pi$-allyl compounds of nickel in combination with electron-acceptor compounds.

Said rubber exhibits improved technological properties, easily blends with ingredients of a rubber compound, can be easily processed into a vulcanizate, features an increased freeze resistance, and can be used at low temperatures, down to the second-order-transition temperature thereof (from −90 to −100° C.).

The present invention relates to stereospecific synthetic rubbers and to methods of their production.

Said rubbers are used as general-purpose rubbers, e.g., for producing tyres, industrial or mechanical rubber articles and goods, etc.

Known in the art are stereospecific cis-polybutadiene rubbers which are obtained by polymerizing 1,3-butadiene, and which are noted for their high elasticity and wear resistance cf., e.g., Belgian Pat. No. 551,851, British Pat. No. 849,589, U.S. Pat. No. 3,040,016).

However, inadequate technological properties of cis-polybutadiene rubbers which they exihibt when being processed, preclude their separate use; said rubbers can be used only in combination with other rubbers.

Another disadvantage of cis-polybutadiene rubbers resides in their enhanced crystallizability, which factor considerably reduces their freeze resistance (the coefficient of freeze resistance of vulcanizates based on said rubbers at a temperature of −45° C. being 0.04).

The object of the present invention is to provide a new type of stereospecific rubber which would feature improved technological properties and higher freeze resistance, and a method for producing such rubber.

In accordance with said and other objects, the present invention resides in that the stereospecific synthetic rubber proposed herein is a cis-copolymer of 1,3-butadiene with conjugated cyclic dienes having from 5 to 6 carbon atoms in the cycle, the content of cyclic links in the copolymer chain ranging from 3 to 20 mol. percent.

The presence of cyclic links in the polymer chain of the rubber improves its technological properties, reduces its cold flow, while the strength characteristics and wear resistance of said rubber remain as high as those of cis-polybutadiene rubbers. The herein-proposed rubber can, therefore, be used not in combination with other rubbers, but separately. An enhanced workability is the main advantage of the present rubber. The herein-proposed rubber can be processed on conventional equipment employed in rubber industry, and it can be vulcanized by following conventional procedures.

Moreover, the presence of cyclic links inhibits crystallization of the rubber, so that the present rubber can be used at low temperatures, down to its second-order-transition temperature. Of greatest interest is the rubber which contains 3 to 10 mol percent of cyclic links and which is characterized by low second-order-transition temperature (from −90 to −100° C.) and high elasticity.

The herein-proposed stereospecific synthetic rubber is produced by copolymerizing 1,3-butadiene with conjugated cyclic dienes having from 5 to 6 carbon atoms in the cycle, with the molar ratio of the monomers being 95–75:5–25 respectively. The process is carried out at a temperature ranging from −15 to −80° C., in the medium of a hydrocarbon solvent, and in the presence of catalysts of $\pi$-allyl type, which are $\pi$-allyl compounds of nickel in combination with electron-acceptor compounds, such as aluminosilicate, chloranil, nickel trichloroacetate, etc.

The investigations carried out by us have shown said stereospecific catalysts to stimulate a process of statistical copolymerization of 1,3-butadiene with conjugated cyclic dienes. The statistical distribution of cyclic links in the polymer chain is confirmed by the continuous variation of the vitrification point of the copolymer with a change in the ratio of 1,3-butadiene and the conjugated cyclodiene in the initial mixture of the monomers.

Close reaction abilities of 1,3-butadiene and conjugated cyclodienes on catalytic system of $\pi$-allyl type make it possible to carry out the copolymerization process with a high degree of conversion (90% and higher).

The method disclosed in the present invention is technologically simple; it can be effected on equipment conventional for rubber industry.

Cis-copolymers of 1,3-butadiene with conjugated cyclodienes were obtained in glass ampoules or in metallic apparatus. The catalyst components, solvent and monomers were charged under such conditions, which precluded penetration of air oxygen and moisture. On completion of the process, the copolymer was precipitated from the solution with an alcohol, e.g., with methanol, and stabilized with an antioxidant, e.g., with phenyl-$\beta$-naphthylamine, with N,N′-diphenylparaphenylenediamine, or with a mixture thereof. The copolymer may also be separated from the solution and stabilized by any other known methods. The structure of the obtained copolymers was established by their IR spectra. The content of 1,4-cis-links was determined at the frequency of oscillations of 740 cm.$^{-1}$, that of 1,4-trans-links, at 967 cm.$^{-1}$, and of 1,2-links, at 910 cm.$^{-1}$. In all the examples cited hereinbelow the copolymers contained 92–97% of 1,4-cis-links, 1–4% of 1,4-trans-links, and 2–4% of 1,2-links. The amount of cyclic links in the chain of the copolymers was determined by the change in the vitrification point of the copolymers, the latter being determined by using Marey's apparatus. The instrinsic viscosity of the copolymers was determined in a solution of toluene at a temperature of 30° C. in an Ubbelohde viscometer.

For a better understanding of the present invention, given hereinbelow are examples, illustrating the producing of stereospecific synthetic rubber on the basis of 1,3-butadiene.

EXAMPLE 1

Copolymerization of 68 mmoles of 1,3-butadiene with 7.5 mmoles of 1,3-cyclohexadiene was carried out in glass ampoule in the presence of a catalytic complex, prepared from bis-($\pi$-crotylnickelchloride) and nickel trichloroacetate. Said catalyst was prepared prior to carrying out the process. For this purpose ca. 5 centimolar toluene solutions of bis($\pi$-crotylnickelchloride) ($2.75 \cdot 10^{-2}$ mmole) and nickel trichloroacetate ($5.5 \cdot 10^{-2}$ mmole) were poured together and kept at room temperature for 30 minutes. The catalytic complex precipitated from the thus combined solutions. Then the solvent was distilled off, and a new portion of toluene and monomers were introduced. The total concentration of monomers in the solution was 3 moles per lit. The process of copolymerization was carried out at a temperature of 20° C. during 6 minutes. On completion of the process, the copolymer was precipitated from the solution and stabilized with an antioxidant phenyl-$\beta$-naphthylamine, in an amount of 1% by weight of the copolymer.

The yield of the copolymer was 9.8%. The vitrification point of the copolymer was −91.7° C.; the amount of cyclic links in the copolymer chain was about 8 mol percent.

EXAMPLE 2

Copolymerization of 40.8 mmoles of 1,3-butadiene with 7.2 mmoles of 1,3-cyclohexadiene was carried out in a glass ampoule in the presence of the same catalytic complex as in Example 1.

Said catalyst was prepared prior to carrying out the copolymerization process. For this purpose there were poured together 5 centimolar toluene solutions of bis-($\pi$-crotylnickelchloride) ($1.7 \cdot 10^{-2}$ mmole) and nickel trichloroacetate ($4.3 \cdot 10^{-2}$ mmole), and were kept at room temperature for 30 minutes. The catalytic complex precipitated. Then the solvent was distilled off, and benzene and monomers were introduced. The total concentration of the monomers in the solution was 3 moles per lit. The process of copolymerization was carried out at a temperature of 22.5° C. during 4 hours. On completion of the process the copolymer was precipitated from the solution and stabilized as described in Example 1.

The yield of the copolymer was 82%. The vitrification point of the copolymer was −86.2° C., and the intrinsic viscosity thereof was 1.095 dl./g. The amount of cyclic links in the copolymer chain was about 10 mol percent.

EXAMPLE 3

Copolymerization of 40.8 mmoles of 1,3-butadiene and 3.07 mmoles of 1,3-cyclohexadiene was carried out in a glass ampoule in the presence of the same catalytic complex as in Example 1. Prior to carrying out the copolymerization process, said catalyst was prepared. For this purpose a 5 centimolar toluene solution of $1.6 \cdot 10^{-2}$ mmole of bis-($\pi$-crotylnickelchloride) was poured together with a 3 centimolar toluene solution of $3.2 \cdot 10^{-2}$ mmole of nickel trichloroacetate, and kept at room temperature during 1 hour. The catalytic complex precipitated. Then the solvent was distilled off, and hexane and monomers were introduced. The total concentration of the monomers in the solution was 3 mol per lit. The copolymerization process was carried out at a temperature of 22.5° C. during 4 hours. On completion of the process, the copolymer was precipitated and stabilized as described in Example 1.

The yield of the copolymer was 49.6%. The copolymer featured vitrification point of −95° C. and intrinsic viscosity of 1.512 dl./g. The amount of cyclic links in the copolymer chain was about 7 mol percent.

EXAMPLE 4

Copolymerization of 29.1 moles of 1,3-butadiene with 3.36 moles of 1,3-cyclohexadiene was carried out in a metallic apparatus in the medium of petrol, in the presence of a catalytic complex prepared from $\pi$-pentenylnickelchloride and nickel trichloroacetate. Said catalyst was prepared prior to carrying out the copolymerization process. For this purpose introduced into an intermediate glass vessel in a stream of an inert gas were 50 ml. of 2 decimolar toluene solution of $\pi$-pentenylnickelchloride and 330 ml. of 3 centimolar toluene solution of nickel trichloroacetate, whereupon the mixture was kept at room temperature for 30 minutes. The formed catalytic complex as a suspension in toluene, the monomers and petrol were introduced into the metallic apparatus in a stream of an inert gas. The total concentration of the monomers in the solution was 28.7 wt. percent. The process of copolymerization was carried out at a temperature of 30° C. during 14 hours. On completion of the process the copolymer was precipitated from the solution with ethanol and stabilized with a mixture of phenyl-$\beta$-naphthylamine with N,N'-diphenylparaphenylenediamine, taken in an amount of 1% by weight of the copolymer (the weight ratio of the stabilizers in the mixture being 1:1).

The yield of the copolymer was 35%. The copolymer featured vitrification point of −96° C. and intrinsic viscosity of 1.74 dl./g. The amount of cyclic links in the copolymer chain was about 6 mol percent.

The obtained rubber can be easily blended with the ingredients of the rubber compound and processed.

On the basis of said rubber a rubber compound was prepared of the following composition (in parts by weight): rubber, 100; stearic acid, 2; zinc oxide, 2; sulphur, 2; N-cyclohexyl - 2 - benzothiazolylsulphenamide, 0.7; active furnace black, 50. Said mixture was vulcanized at a temperature of 143° C. during 30 minutes.

The physico-mechanical properties of the obtained vulcanizate were as follows:

| | |
|---|---|
| Tensile strength, kg./cm.$^2$ | 178 |
| Relative elongation, percent | 570 |
| Abrasion resistance, cm.$^3$/kw.h. | 191 |
| Rebound elasticity at 20° C., percent | 36 |
| Freeze resistance coefficient at −45° C. | 0.80 |

EXAMPLE 5

Copolymerization of 60.4 mmoles of 1,3-butadiene with 15.1 mmoles of 1,3-cyclohexadiene was carried out in a glass ampoule in the presence of a catalytic complex prepared from bis-($\pi$-crotylnickeliodide) and nickel trichloroacetate.

Said catalyst was prepared prior to carrying out the copolymerization process. For this purpose 5 centimolar toluene solutions of bis-($\pi$-crotylnickeliodide) ($2.75 \cdot 10^{-2}$ mmole) and nickel trichloroacetate ($5.5 \cdot 10^{-2}$ mmole) were poured together and kept at room temperature during 30 minutes. The catalytic complex precipitated. Then the solvent was distilled off, and a new portion of toluene and the monomers were introduced. The total concentration of the monomers in the solution was 3 mol per lit. The process of copolymerization was carried out during 20 minutes at a temperature of 20° C. On completion of the process the copolymer was precipitated from the solution and stabilized as described in Example 1.

The yield of the copolymer was 12.5%. The vitrification point of the copolymer was −68.5° C.; the content of cyclic links in the copolymer chain was about 18 mol percent.

EXAMPLE 6

Copolymerization of 54.4 mmoles of 1,3-butadiene with 6.04 mmoles of 1,3-cyclohexadiene was carried out in a glass ampoule in the presence of a catalytic complex prepared from bis-($\pi$-crotylnickelchloride) and chloranil.

Prior to effecting the copolymerization process, said catalyst was prepared. This was done by pouring together a 5 centimolar toluene solution of $0.9 \cdot 10^{-1}$ mmole of bis-($\pi$-crotylnickelchloride) and a 6 centimolar toluene solution of $1.8 \cdot 10^{-1}$ mmole of chloranil and keeping the mixture at room temperature during 30 minutes. The catalytic complex precipitated. Then the solvent was distilled off, and a mixture of benzene and cyclohexane taken in a voluminal ratio of 1:1 and the monomers were introduced. The total concentration of the monomers in the solution was 4 mol per lit. The process of copolymerization was carried out at a temperature of 20° C. during 18 hours. On completion of the process the copolymer was precipitated from the solution and stabilized as described in Example 1.

The yield of the copolymer was 9.7%. The vitrification point of the copolymer was —92° C., and the intrinsic viscosity, 1.34 dl./g. The content of cyclic links in the copolymer chain was about 8 mol percent.

EXAMPLE 7

Copolymerization of 67.5 mmoles of 1,3-butadiene with 3.55 mmoles of 1,3-cyclohexadiene was carried out in a glass ampoule in the medium of toluene, in the presence of a catalytic complex prepared from bis-($\pi$-allylnickelbromide) and chloranil. The total concentration of the monomers in the solution was 3 mol per lit.

Said catalyst was prepared before effecting the copolymerization process. To do this, 5 centimolar toluene solutions of bis-($\pi$-allylnickelbromide) ($1.06 \cdot 10^{-1}$ mmole) and chloranil ($1.06 \cdot 10^{-1}$ mmole) were introduced into the ampoule. Besides, the entire solvent required for effecting the copolymerization process was also introduced into the ampoule. The contents of the ampoule were kept at a temperature of 10° C. during 10 minutes till the commencement of the precipitation, after which the monomers were introduced into the ampoule. The process of copolymerization was carried out at a temperature of —12° C. during 24 hours. On completion of the process the copolymer was precipitated from the solution and stabilized as described in Example 1.

The yield of the copolymer was 6%. The copolymer featured vitrification point of —103° C. and intrinsic viscosity of 0.8 dl./g. The content of cyclic links in the copolymer chain was 3 mol percent.

EXAMPLE 8

Copolymerization of 27.8 moles of 1,3-butadiene with 3.15 moles of 1,3-cyclohexadiene was carried out in a metallic apparatus in the medium of petrol in the presence of a catalytic complex prepared from $\pi$-pentenylnickelchloride and chloranil.

Before carrying out the copolymerization process, said catalyst was prepared. To do this, into an intermediate glass vessel in a stream of an inert gas there were introduced 72 ml. of a 2 decimolar toluene solution of $\pi$-pentenylnickelchloride and 187 ml. of a 6 centimolar toluene solution of chloranil, and kept at room temperature during 30 minutes. The resulting catalytic complex in the form of a suspension in toluene, the monomers and petrol were introduced into a metallic apparatus in a stream of an inert gas. The total concentration of the monomers in the solution was 26.4 wt. percent. The copolymerization process was carried out at a temperature of 30° C. during 6 hours. On completion of the process the copolymer was precipitated from the solution and stabilized as described in Example 4.

The yield of the copolymer was 42%. The copolymer featured vitrification point of —97° C. and intrinsic viscosity of 1.14 dl./g. The content of cyclic links in the copolymer chain was about 6 mol percent.

The obtained rubber easily blends with the ingredients of the rubber compound and can be easily processed into vulcanizate.

On the basis of said rubber a rubber mixture was prepared, comprising the following constituents (in parts by weight): rubber, 100; stearic acid, 2; zinc oxide, 2; sulphur, 2; N-cyclohexyl-2-benzothiazolyl sulphenamide, 0.7; active furnace black, 50. Said mixture was vulcanized at a temperature of 143° C. during 30 minutes.

The physico-mechanical properties of the obtained vulcanizate were as follows:

Tensile strength, kg./cm.$^2$ _____ 165
Relative elongation, percent _____ 520
Abrasion resistance, cm.$^3$/kw.h. _____ 177
Rebound elastically at 20° C., percent _____ 36
Freeze resistance coefficient at —45° C. _____ 0.80

EXAMPLE 9

Copolymerization of 69.3 mmole of 1,3-butadiene with 23.1 mmoles of 1,3-cyclohexadiene was carried out in a glass ampoule in the medium of toluene, in the presence of a catalytic complex, prepared from bis-($\pi$-crotylnickelchloride) and chloral.

Before carrying out the copolymerization, said catalyst was prepared. This was done by pouring together 5 centimolar toluene solutions of bis-($\pi$-crotylnickelchloride) ($9.2 \cdot 10^{-2}$ mmole) and chloral ($9.2 \cdot 10^{-2}$ mmole) and keeping the mixture at a temperature of 10° C. during 1 hour. Then the remaining required quantity of toluene and the monomers were introduced into the ampolue. The total concentration of the monomers in the solution was 4 mol per lit. The process of copolymerization was carried out at a temperature of 20° C. during 40 minutes. On completion of the process the copolymer was precipitated from the solution and stabilized as described in Example 1.

The yield of the copolymer was 9.8%. The vitrification point of the copolymer was —63.5° C. The content of cyclic links in the copolymer chain was about 20 mol. percent.

EXAMPLE 10

Copolymerization of 68 mmoles of 1,3-butadiene with 12 mmoles of 1,3-cyclohexadiene was carried out in a glass ampoule in the medium of toluene, in the presence of a catalytic complex, prepared from bis($\pi$-crotylnickelchloride) and nickel chloride.

Before carrying out the copolymerization process, said catalyst was prepared. For this purpose 4.4 mmoles of dry nickel chloride were charged into the ampoule and kept under a vacuum (at a residual pressure of $10^{-2}$ mm. Hg) at a temperature of 150° C. during 1.5 hours. Then a 5 centimolar toluene solution of $2.28 \cdot 10^{-1}$ mmole of bis-($\pi$-crotylnickelchloride) was introduced into the ampoule. The catalytic complex was formed at room temperature during 1 hour, and after that the remaining portion of the solvent and the monomers were charged. The total concentration of the monomers in the solution was 4.4 mol per lit. The process of copolymerization was carried out at a temperature of 50° C. during 11 hours. On completion of the process the copolymer was precipitated from the solution and stabilized as described in Example 1.

The yield of the copolymer was 58.9%. The copolymer featured vitrification point of —88.5° C. and intrinsic viscosity of 0.35 dl./g. The content of cyclic links in the copolymer chain was about 10 mol percent.

EXAMPLE 11

Copolymerization of 70.7 mmoles of 1,3-butadiene with 7.85 mmoles of 1,3-cyclohexadiene was carried out in a glass ampoule in the medium of benzene, in the presence of a catalytic complex, prepared from bis-($\pi$-crotylnickelchloride) and alumosilicate.

Prior to carrying out the copolymerization process, said catalyst was prepared. This was done by charging the ampoule with 0.11 g. of alumosilicate and keeping it under a vacuum (at a residual pressure of $10^{-2}$ mm. Hg) at a temperature of 250–300° C. during 2 hours. After cooling to room temperature, the ampoule was charged with a 5 centimolar toluene solution of $3.9 \cdot 10^{-2}$ mmole of bis-($\pi$-crotylnickelchloride), benzene and the monomers. The total concentration of the monomers in the solution was 4 mol per lit. The process of copolymerization was carried out at a temperature of 20° C. during 8 hours. On completion of the process the copolymer was precipitated from the solution and stabilized as described in Example 1.

The yield of the copolymer was 21%. The copolymer featured vitrification point of −95° C. and intrinsic viscosity of 1 dl./g. The content of cyclic links in the copolymer chain was about 7 mol. percent.

EXAMPLE 12

Copolymerization of 70.7 mmoles of 1,3-butadiene with 7.85 mmoles of 1,3-cyclohexadiene was carried out in a glass ampoule in the medium of petrol, in the presence of a catalytic complex, prepared from π-pentenylnickelchloride and alumosilicate.

Before carrying out the copolymerization process, said catalyst was prepared. For this purpose the ampoule was charged with 0.098 g. of alumosilicate and kept under a vacuum (at a residual pressure of $10^{-2}$ mm. Hg) at a temperature of 250–300° C. during 2 hours. After having been cooled to room temperature, the ampoule was charged with a decimolar toluene solution of $7.85 \cdot 10^{-2}$ mmole of π-pentenylnickelchloride, petrol and the monomers. The total concentration of the monomers in the solution was 5 mol per lit. The process of copolymerization was carried out at a temperature of 50° C. during 3.5 hours. On completion of the process the copolymer was precipitated from the solution and stabilized as described in Example 1.

The yield of the copolymer was 63%. The vitrification point of the copolymer was −97° C., the intrinsic viscosity of the copolymer was 0.78 dl./g. The content of cyclic links in the copolymer chain was about 6 mol. percent.

Copolymerization of 68 mmoles of 1,3-butadiene with 12 mmoles of 2-methyl-1,3-cyclohexadiene was carried out in a glass ampoule in the medium of toluene, in the presence of a catalytic complex, prepared from bis-(π-crotylnickelchloride) and chloranil. The total concentration of the monomers in the solution was 3 mol. per lit.

Before carrying out the copolymerization process, said catalyst was prepared. This was done by introducing 5 centimolar solutions of bis-(π-crotylnickelchloride) ($1.14 \cdot 10^{-1}$ mmole) and chloranil ($1.14 \cdot 10^{-1}$ mmole) into the ampoule. Besides, the entire required quantity of the solvent was introduced into the ampoule. The contents of the ampoule were kept at a temperature of 10° C. during 10 minutes, till the precipitate commenced to form, after which the monomers were introduced into the ampoule. The process of copolymerization was carried out at a temperature of 22.5° C. during 3 hours. On completion of the process the copolymer was precipitated from the solution and stabilized as described in Example 1.

The yield of the copolymer was 80.5%. The intrinsic viscosity of the copolymer was 1.05 dl./g. The content of cyclic links in the copolymer chain was about 10 mol percent.

EXAMPLE 14

Copolymerization of 68 mmoles of 1,3-butadiene with 12 mmoles of 1,3-cyclopentadiene was carried out in a glass ampoule in the presence of a catalytic complex, prepared from bis-(π-crotylnickelchloride) and nickel trichloroacetate.

Before carrying out the copolymerization process, said catalyst was prepared. For this purpose 5 centimolar solutions of bis-(π-crotylnickelchloride) ($1.1 \cdot 10^{-1}$ mmole and nickel trichloroacetate ($2.2 \cdot 10^{-1}$ mmole) were poured together and kept at room temperature during 30 minutes. The catalytic complex precipitated. Then the solvent was distilled off, and a new portion of toluene and the monomers were introduced. The total concentration of the monomers in the solution was 5 mol per lit. The process of copolymerization was carried out at a temperature of 20° C. during 20 hours. On completion of the process the copolymer was precipitated from the solution and stabilized as described in Example 1.

The yield of the copolymer was 23.4%. The vitrification point of the copolymer was −65° C.; the content of cyclic links in the copolymer chain was about 10 mol percent.

EXAMPLE 15

Copolymerization of 40.8 mmoles of 1,3-butadiene with 7.2 mmoles of 1-methyl-2,4-cyclopentadiene was carreid out in a glass ampoule in the toluene medium, in the presence of the same catalytic complex as in Example 14.

Prior to carrying out the copolymerization process, said catalyst was prepared. This was done by pouring together 5 centimolar toluene solutions of bis-(π-crotylnickelchloride) ($7.2 \cdot 10^{-2}$ mmole) and nickel trichloroacetate ($1.44 \cdot 10^{-1}$ mmole) and keeping the mixture at room temperature during 30 minutes. Then the solvent was distilled off, and a new portion of toulene and the solvent were introduced. The total concentration of the monomers in the solution was 5 mol per lit. The process of copolymerization was carried out at a temperature of 35° C. during 6 hours. On completion of the process the copolymer was precipitated from the solution and stabilized as described in Example 1.

The yield of the copolymer was 15%. The content of cyclic links in the copolymer chain was about 10 mol percent.

What is claimed is:

1. A method of producing a stereospecific synthetic rubber, according to which 1,3-butadiene is copolymerized with conjugated cyclic dienes having from 5 to 6 carbon atoms, with the molar ratio of the monomers being 95–75:5–25 respectively, at a temperature ranging from −15 to +80° C., in a hydrocarbon solvent, in the presence of a catalytic amount of π-allyl compounds of nickel in combination with an electron-acceptor compound selected from the group consisting of aluminosilicate, chloranil, nickel trichloroacetate, chloral, and nickel chloride.

2. A method as claimed in claim 1, wherein said electron-acceptor is aluminosilicate.

References Cited

UNITED STATES PATENTS

| 3,134,824 | 5/1964 | Walker et al. | 260—683.15 |
| 3,148,158 | 9/1964 | Schenck et al. | 252—450 |
| 3,379,706 | 4/1968 | Wilke | 260—94.3 |
| 3,468,866 | 9/1969 | Alferov | 260—94.3 |
| 3,476,721 | 11/1969 | Binder et al. | 260—82.1 |

JOSEPH L. SCHOFER, Primary Examiner

A. HOLLER, Assistant Examiner

U.S. Cl. X.R.

252—428